April 13, 1937. A. F. WEDLAKE 2,077,082
DEVICE FOR MEASURING CAMBER AND CASTER IN WHEEL AND AXLE MECHANISMS
Filed Jan. 25, 1934
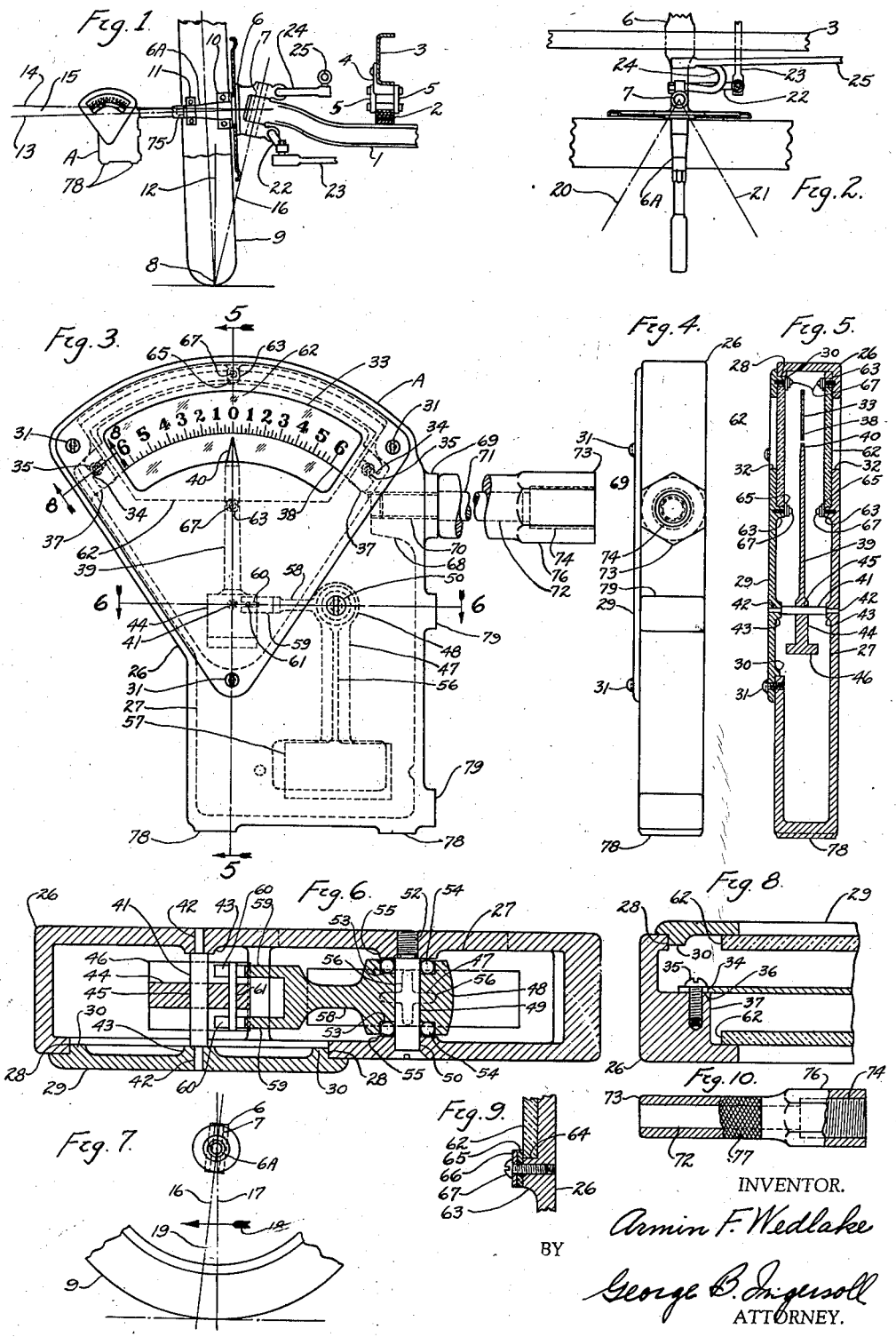
INVENTOR.
Armin F. Wedlake
BY
George B. Ingersoll
ATTORNEY.

Patented Apr. 13, 1937

2,077,082

UNITED STATES PATENT OFFICE 2,077,082

DEVICE FOR MEASURING CAMBER AND CASTER IN WHEEL AND AXLE MECHANISMS

Armin F. Wedlake, Detroit, Mich.

Application January 25, 1934, Serial No. 708,184

15 Claims. (Cl. 33—203)

My invention relates to improvements in a device for measuring the camber and caster of an axle and wheel mechanism used in vehicles, and the objects of my invention are, first, to provide a device which can be supported directly on the spindle or similar portion of a wheel and axle mechanism; second, to provide a device which can be moved in conjunction with the steering mechanism of a vehicle, the movement of the device determining the amount of caster in the axle; third, to provide a device for measuring the camber and caster of an axle and wheel mechanism, and which will enable the measurement readings to be taken with the vehicle supported by its wheels on a floor and with the weight on the wheels being distributed as under actual load conditions; fourth, to provide a measuring device actuated by a movable member actuated by gravity; fifth, to provide a measuring device actuated by a pendulum member; sixth, to provide a measuring device provided with an indicating member actuated by a pendulum, the travel of the indicating member being multiplied relative to the travel of the pendulum; seventh, to provide a measuring device constructed with a minimum of wearing points; eighth, to provide a measuring device for determining the camber and caster of an axle and wheel mechanism which will readily indicate the degrees of caster or camber without the necessity of the operator taking measurements or making adjustments to determine the amount of caster and camber; ninth, to provide a device for measuring camber and caster of an axle and wheel mechanism and which can be mounted on the spindle of the wheel and axle mechanism approximately at the point where the nut is located for retaining the wheel assembly; tenth, to provide a measuring device that can be used as a level on substantially flat vertical surfaces; eleventh, to provide a measuring device that can be used as a plumb gauge on surfaces extending perpendicular or at an angle with the horizontal; and twelfth, to provide methods for determining the camber and caster angles of a wheel and axle mechanism.

I attain these objects by the mechanism illustrated in the accompanying drawing, in which—

Figure 1 is a side view of my device as applied to and supported by the spindle member of a front steering wheel and axle mechanism of a vehicle, the device indicating the amount of camber in the spindle of the axle mechanism and consequently in the position of the wheel mounted on the axle mechanism; Fig. 2, a plan view of the device and the wheel and axle mechanism as disclosed in Fig. 1; Fig. 3, a side view of the measuring device; Fig. 4, an end view of the device disclosed in Fig. 3; Fig. 5, a sectional view of the measuring device taken on the line 5—5, Fig. 3; Fig. 6, a sectional view of the device taken on the line 6—6, Fig. 3; Fig. 7, an end view of the wheel and axle mechanism disclosing the caster angle of the axle mechanism; Fig. 8, a sectional view of the measuring device assembly taken on the line 8—8, Fig. 3; Fig. 9, a sectional view disclosing the method of securing the glass or window member in the measuring device, said section being taken on the line 5—5, Fig. 3; and Fig. 10, a detailed view of the nut and bushing for supporting the measuring device.

Similar numerals refer to similar parts throughout the several views.

My measuring device is adapted for determining the amount of the angle of the camber and caster of a steering wheel and axle mechanism of an automotive vehicle, and to accomplish this without the necessity of the operator or mechanic making individual adjustments and measurements to determine the amount of the camber and caster characteristics of a particular steering wheel and axle mechanisms.

Figures 1 and 2 disclose sufficient of the front steering wheel and axle mechanism and their connective parts of a chassis of a vehicle to disclose the method of attaching my measuring device to the wheel and axle mechanism and its operation. The axle beam 1 of the vehicle is suitably connected to the spring 2 which is further connected to the frame 3 of the vehicle by the brackets 4 and the shackles 5 which may be pivotally connected to the spring 2 and the brackets 4.

It is to be understood that whereas a steering wheel and axle mechanism is disclosed as being provided with the axle beam 1, my measuring device is adapted for use for determining the camber and caster of the steering wheel and so-called mechanisms when said wheel mechanisms are individually sprung or connected to the frame 3, the axle assembly installation herein disclosed being merely illustrated for the means of showing the application of my measuring device when used for determining the camber and caster of the steering wheel or axle mechanism of a vehicle, the term "axle mechanism" being thus herein used to designate both individually sprung wheel mechanisms as well as the conventional axle assembly incorporating an axle beam such as 1 to simplify the disclosure.

The spindle 6 is pivotally mounted on the spindle pin 7 which may be fixedly mounted in the axle beam 1, the axis of the spindle pin 7 being inclined at the desired angle so that the point of the extended axis of the spindle pin 7 will intersect the ground approximately at the center line 8 of the wheel assembly 9 which is revolvably mounted on the bearings 10 and 11 which are in turn suitably retained on the shaft portion 6A of the spindle 6.

In order to maintain the wear of the tire of the wheel assembly 9 at a minimum and at the same time to insure that the center line 8 of the wheel assembly line is always dished or cambered slightly relative to the vertical line 12, as disclosed in Fig. 1, the axis 13 of the shaft portion 6A of the spindle 6 is always inclined at a slight angle relative to the horizontal line 14 as disclosed in Fig. 1.

It is always highly desirable that the angle 15, as indicated in Fig. 1 and which is known as the camber of the wheel assembly 9 should be maintained at a sufficient amount to always insure that the center line 8 of the wheel assembly 9 will never change due to wear or take up of operating clearances in the mechanism of the axle and steering mechanisms to a position where it coincides with the vertical line 12 and thus change to a position on the other or inside of the vertical line 12, thus producing what is known as a reversed camber and which would clearly increase the wear of the tire of the wheel assembly 9 and interfere with the steering operation. Therefore in order to always insure that the angle of camber 15 will be of sufficient amount to maintain the wear of the tire of the wheel assembly 9 at a minimum and to insure the best operation of the wheel, steering and axle mechanisms of a motor vehicle, I have provided a device for quickly measuring the camber angle 15 so that a mechanic by the simple installation of my measuring device on the shaft portion 6A of the spindle 6 may immediately determine the camber angle 15, my measuring device automatically measuring the camber angle 15 and recording it for observation by the operator or mechanic.

Also in order to secure the best operation of the wheel, steering and axle mechanisms, the center line of the spindle pin 7 is inclined in a vertical fore and aft plane as disclosed in Fig. 7. The axis 16 of the spindle pin 7 is thus inclined relative to a vertical line 17 extending through the axis of the shaft portion 6A of the spindle 6 as disclosed in Fig. 7, the axis 16 of the spindle 7 being inclined in a plane located ahead of the vertical line 17 as indicated by the arrow 18 which denotes the direction of the motion of the vehicle. The angle 19 between the inclined axis 16 of the spindle pin 7 and the vertical line 17 as disclosed in Fig. 7 is known as the angle of caster of the axle and steering mechanisms. The angle of caster 19 is a very important feature in that this construction produces a trailer effect of the axis, together with its steering and wheel mechanism which further tends to cause the wheel assembly 9 of a vehicle to tend to always maintain the steering and axle mechanism in a straight ahead position, the point of contact of the wheel assembly 9 with the ground being located in the rear of the point at which the axis 16 of the shaft portion 6A of the steering spindle 6 meets the ground, the steering wheel assembly 9 thus trailing and being automatically maintained in a straight ahead position by the road resistance.

It is very important to always insure that there will be a definite amount of caster angle 19, although it is very desirable to maintain the amount of the caster angle 19 at a minimum as the presence of an excessive angle of caster 19 produces shimmy of the wheel assembly 9 as well as tramping, tire wear, and other serious and important difficulties and troubles in the wheel, steering, and axle mechanisms of a vehicle.

With my measuring device the amount of caster angle 19 may be quickly determined by attaching the measuring device assembly A to the shaft portion 6A of the spindle 6 as disclosed in Fig. 1 and then by operating the shaft portion 6A of the spindle 6 to its forward extreme position as indicated by the line 20 in Fig. 2 and then noting the reading as indicated by the pointer of the measuring device, then operating the shaft portion 6A of the spindle 6 together with its wheel assembly 9 to its extreme rearward angular position as indicated by the line 21 in Fig. 2 and then noting the reading of the measuring instrument as indicated by the pointer thereon. After the operator has thus determined the amount of the angle reading of the measuring device assembly A, when attached to the shaft portion 6A of the spindle 6 in its extreme forward position as indicated by the line 20 and in its extreme rearward position as indicated by the line 21, the operator merely notes these two recorded results and subtracts the lesser from the larger of the results, or in other words takes the difference of the two amounts to obtain the actual amount of caster angle 19 in the particular axle mechanism to which the measuring device assembly A is attached and operated with as hereinafter disclosed.

Heretofore it has been necessary for an operator to actually make a correct number of measurements and adjustments with a very elaborate and complicated measuring mechanism in order to determine the amount of camber angle 15 and caster angle 19 of the steering wheel and axle mechanisms of a vehicle, and these measurements and adjustments have been so complicated and numerous that it has been practically impossible for an operator to obtain the actual and correct measurements unless the operator is a skilled mechanic.

It is to be understood that the measuring device assembly when installed on the shaft portion 6A of the spindle 6 may be pivotally moved with the spindle 6 to the maximum forward steering angle as indicated by the line 20 and to the maximum rearward steering angle as indicated by the line 21, by the steering mechanism of the vehicle which comprises the steering arm 22 which is suitably connected and attached to and pivotally moves with the spindle 6, the steering arm 22 being pivotally connected with the steering cross tube 23 which is operatively connected with the steering mechanism of the wheel assembly at the opposite side of the vehicle, said oppositely disposed wheel assembly not being disclosed on the drawing. The steering arm 24 is also connected with the spindle 6 and is adapted to pivotally move therewith and is pivotally connected to the drag link 25 which is operatively connected with the steering gear mechanism of the vehicle, the complete steering gear mechanism not being disclosed in the drawing.

The measuring device assembly A is provided with the housing 26 which is provided with the chamber 27 therein, the housing 26 being provided with the observation opening 28 in one of its sides in which is secured the cover member 29, the cover member 29 being provided with the pilot portions 30 for engaging the opening 28 to locate the cover member 29 therein. The cover member 29 is secured in its assembled position by the screws 31 which extend through the cover member 29 and engage the housing 26. The housing 26 and the cover member 29 are each provided with the observation opening 32 to provide visibility for noting the readings on the dial 33 which is provided with the slots 34 and which are engaged by the screws 35, the screws 35 securing the dial 33 to the surfaces 36 of the bosses 37 of the housing 26.

It is to be noted that the dial 33 will be thus mounted in a plane extending between the outer surface of one of the walls of the housing 26 and the outer surface of the cover member 29, the dial member 33 being constructed in the form of a segment having an inner arcuate surface 38 located adjacent the outer end of the indicator member 39, the indicator member having the conical end 40 adjacent the arcuate surface 38 of the dial 33, the indicator member 39 being pivotally mounted on the pin 41, the pin 41 being provided with the shouldered portions 42 which are suitably secured in the bosses 43 of the housing 26 and cover member 29. The indicator member 39 is provided with a boss portion 44 which incorporates the bore 45 which forms a bearing on the journal portion of the pin 41, the end of the boss portion 44 being provided with the enlarged portion or end portion 46 which forms a mass acting as a counterweight for balancing the portions of the indicator member oppositely disposed about the pin 41 in a normal or vertical position. The boss portion 46 will thus provide a balanced indicator member, the indicating portion of which will be always maintained normally in an upright position as shown in Fig. 3 by the force of gravity acting on the counterweight or boss portion 46. The pendulum or member 47 is provided with the boss portion 48 which is provided with the bore 49 for receiving the screw 50 therethrough, the screw 50 being supported in the bosses 55 of the housing 26, the screw 50 being provided with the threaded end 52 for engaging one of the walls of the housing 26.

The boss portion 48 of the pendulum 47 is provided with the oppositely disposed recesses 53 which form outer races for the ball members 54 which further have a bearing on the body or shaft portion of the screw 50. The recesses 53 will be of sufficient width or distance into the boss portion 48 so that the ball members 54 will also have a bearing contact on the inside surfaces of the bosses 55 of the housing 26 and also on the bottom or end surfaces of the recesses 53 of the boss 48 and also thus providing an antifriction bearing upon which the pendulum 47 is pivotally mounted, the ball members 54 thus being adapted to absorb radial and end thrust loads, the pendulum 47 being provided with the ribs 56 to provide the proper section and strength and light weight in the section of the pendulum connecting the boss portion 48 with the counterweight or boss portion 57, the counterweight 57 being of sufficient size and located at the proper distance from the fulcrum point or pin 50 to permit the counterweight 57 when acted upon by gravity to move and maintain the indicator member 39 in its proper recording position relative to the portion of the counterweight 57. The pendulum 47 is provided with the arm 58 which extends substantially at right angles to a line extending through the fulcrum point 50 and the center of the counterweight 57, the arm 58 being provided with the forked portions 59 each provided with a slot 60 which engages and fits the sides of the pin 61 which is suitably mounted and secured in the boss portion 44 of the indicator member 39, the pin 61 being located at a point intermediate the fulcrum point 41 of the indicator member 39 and the fulcrum point 50 of the pendulum 47, the position on the pin 61 thus substantially forming a lever arm relative to the fulcrum point or pin 41 of the indicator member 39.

It is also to be noted that with the pendulum 47, thus mounted on the ball members 54, and with the slots 60 having a line contact on the pin 61, the pin 61 being thus adapted to slide within the slots 60, that the pendulum 47 and the indicator member 39 will thus be mounted not only to provide a minimum of wearing points but will be very sensitively mounted so that any movement of the pendulum 47 will be immediately recorded by the indicator member 39 on the dial 33.

It is to be further noted that the position of the counterweight 57 relative to the fulcrum point 50 will constitute a lever arm of sufficient length relative to the position of the pin 61 about the fulcrum point or pin 41 so that the movement of the end 40 of the indicator member 39 will be multiplied or increased several times over the length of movement of the arc travelled by the counterweight 57 as it is pivotally actuated by the force of gravity about the fulcrum point 50, and thus the multiplicity of the leverage of my actuated measuring mechanism will provide for sufficient spacings between the numerals or symbols on the dial 33 to allow for the spacing of the device between the numerals or symbols to be of sufficient width as to render them easily and readily legible and easily noted by the operator.

Also the distance between the numerals "5" and "6" for instance, on the dial 33, will have a greater distance therebetween than that existing betwen the nought and the numeral "1", this being due to constructing the dial 33 with its numerals or symbols to accurately record the actual movement of the indicator member 39 as it is actuated through the movement along its arc of travel. Thus my leverage mechanism compensates for the actual variation of movement in the pin 61 of the indicator member 39 through its arc relative to the movement of the arm 58 and its slots 60 through their arc about the pin 50. In the mechanism of my measuring device assembly I have disclosed the conical end 40 of the indicator member 39 as being adapted to travel seven times the distance traveled by the counterweight 57 in its movement along its arc of travel.

It is also to be noted that whereas I have disclosed a system of lever arms as connecting the pendulum 47 with the indicator member 39, I realize that it is possible to operatively connect the indicator member 39 with the pendulum 47 by means of a gear mechanism and thus I do not wish to limit my claims to the pin construction shown in the drawing as herewith disclosed.

The glass or transparent window members 62 are of sufficient size and shape as to cover the observation openings 32 in the housing 26 and the cover member 39, the glass members 62 being located between the bosses 63 of the cover member 29 and the housing 26. The bosses 63 are provided with the shouldered surfaces 64 which are contacted by the glass members 62, the glass members 62 being retained in place by the rubber washers 65 which are located so that their edges overhang the edge of the glass members 62 and thereby retain the glass members 62 in their assembled positions. The washer 65 may be constructed of rubber or similar resilient material and will be retained by the metal washer 66, the washers 65 and 66 being retained by the screws 67 which extend therethrough and threadably engage the bosses 63 of the housing 26 and the cover member 29. The housing 26 will be provided with the boss portion 68 extending within the chamber 27 and having the boss portion 69 extending on the outside of the housing 26, the boss portions 68 and 69 being provided with the threaded hole 70 which is engaged by the threaded end of the stud member 71, the stud member 71 being adapted to fit and oscillate or rotate within the bore 72 of the combined nut and bushing 73.

The combined nut and bushing 73 is provided with the tapped hole 74 which is adapted to engage and fit on the threaded end 75 of the shaft portion 6A of the spindle 6 as disclosed in Fig. 1, the threaded end 75 being a portion of the shaft portion 6A of the spindle 6 and which conventionally receives the nut for holding and securing the bearing assemblies 10 and 11 in their assembled position on the shaft portion 6A of the spindle member 6, the conventional nut on the threaded portion 75 thus holding the wheel assembly 9 in its operative position on the shaft portion 6A of the spindle member 6.

It is to be understood that in some installations the threaded portion 75 will be of sufficient length so that the tapped hole 74 can be threadably mounted on the threaded portion 75 without removing the conventional nut which secures the bearings 10 and 11 in their assembled positions. However, if the threaded portion 75 is not of sufficient length with said conventional nut in its assembled and securing position, said conventional nut can be removed and the combined nut and bushing 73 installed thereon, the tapped hole 74 enabling the combined nut and bushing 73 to secure the bearings 10 and 11 in the wheel assembly 9 in its operative position.

With the combined nut and bushing 73 thus installed, the stud 71 which supports the measuring device assembly A can be telescopically inserted within the bore 72 of the combined nut and bushing 73 and thus be rotatably supported on the end of the spindle member 6. The nut and bushing member 73 may be provided with the hexagon shaped portion 76 to facilitate its being operated to its retaining position on the shaft portion 6A of the spindle member 6, and the nut and bushing member 73 may be further provided with the knurled portion 77 for convenience in handling.

It is to be understood that whereas the combined bushing member 73 will be provided with the tapped hole 74 of the proper size to permit installation on the various sizes of threaded portions 75 with which the shaft portions of various spindle members of the axle mechanisms of motor vehicles are provided, the measuring device assembly A may be provided with a set of sufficient number of sizes to facilitate the use of my measuring device assembly with any desired number of different makes of axle mechanisms of motor vehicles.

As above stated, my measuring device assembly A will thus be readily installed on the shaft portion 6A of the spindle member 6 and located in alignment with the axis of the wheel assemblies, the angle of camber being immediately indicated by the position of the indicator member 39 relative to the numerals or symbols on the dial 33. Then as the steering wheel and axle mechanisms are operated to move the axis of the shaft portion 6A of the spindle member 6 to its foremost position as indicated by the line 20 and to its rearmost position as indicated by the line 21, the two results can be very quickly noted by the operator and the difference of these two results obtained, will indicate the angle of caster of the axle mechanism of the vehicle, thus dispensing with the services of a skilled mechanic and economically conserving time and effort that is consumed in the complicated operation of the conventional camber and caster measuring devices used commercially.

It is also to be especially noted that as above stated, my measuring device assembly A can thus be installed to allow the result of camber and caster reading on the dial 33 to be taken with the vehicle resting on the floor, its weight being distributed on the wheels as under actual road conditions, the floor or similar support being constructed with sufficiently flat and level characteristics to provide relatively correct reading of the measuring device assembly A.

It is also to be noted that the housing 26 is provided with the base surfaces or bosses 78 which will permit the measuring assembly A to be used as a level member for determining the level or anti-level characteristics of flat surfaces located in substantially horizontal planes by merely resting the base surfaces of the bosses 78 of the measuring device assembly A on the plane or surface to be measured.

Also the housing 26 will be further provided with the portions 79 which will permit my measuring device assembly A to be installed in positions against upright surfaces extending substantially in a vertical plane to permit the measuring device assembly A to be used as a plumb gauge for determining the relative squareness of the upright surfaces.

The dial 33 will be provided with the symbols or numerals, indicating the amount of angle of the camber or caster, on both of its oppositely disposed sides where the measurement can be readily noted through the openings 32 and the transparent windows 62, the symbols or numerals being unequally spaced to represent equal angles as above described.

A name plate may be suitably secured to an outer surface of the housing 26 as desired.

It is also to be noted that the portion of the housing 26 together with its observation openings 32 as well as the cover member 29 and its observation opening 32 may be constructed with a shape to conform with the pivotal motion of the indicator 39 and to conserve the shape and size of the complete measuring device assembly A.

It is to be understood that if the angle of caster indicated by the measuring device assembly A at the line 20 should be a lesser angle than that indicated at the line 21, Fig. 2, this would indicate a negative caster, and the pre-determined angle of caster at which it is desired that the wheel and axle mechanism should operate for proper operation should always be such that the greater angle of caster will be indicated at the line 20, Fig. 2.

I claim:

1. In a device for measuring the angle of camber and caster of a wheel mounted on a spindle of an axle mechanism, the combination of a housing provided with a pair of oppositely disposed openings therein, said housing being further provided with a stud extending therefrom, a dial suitably mounted in said housing between the oppositely disposed openings and provided with symbols denoting angles, an indicator member pivotally mounted and having an end located to move adjacent said dial, said indicator member being provided with a counterweight to balance said indicator member in a vertical position, a pin suitably mounted in said indicator member, a pendulum pivotally mounted in said housing and provided with a counterweight actuated by gravity, said pendulum being further provided with an arm having a slot for engaging said pin, a transparent member suitably mounted in said housing between said dial and each of the oppositely disposed openings of said housing, and a member provided with a bore slidably engaging said stud, said last mentioned member being adapted to engage the spindle of the wheel to support the device for measuring the angle of camber and caster of the wheel and axle mechanism.

2. In a device for measuring the camber and caster of a wheel and axle mechanism, the combination of an indicator member movably mounted provided with a lever arm, means for actuating said indicator member in accordance with the angular amount of camber or caster, said last mentioned means being actuated by the force of gravity and provided with a lever arm, a pin member mounted in one of said lever arms and engaging the other of said lever arms, and a dial provided with unequal spaces for indicating equal angles of camber or caster.

3. In a device for measuring the camber and caster of a wheel and spindle mechanism, the combination of a housing provided with an observation opening therein, together with a larger opening oppositely disposed to said observation opening, a cover member suitably mounted in the larger opening of said housing and provided with an observation opening, a dial member suitably mounted in said housing between the observation openings of said housing and said cover member, an indicator pivotally mounted in said housing and adapted to move adjacent said dial member, a pendulum pivotally mounted in said housing at a point removed from the axle of the spindle and operatively connected with said indicator by a pin and slot mechanism, said pendulum being actuated by gravity to operate said indicator, and means for supporting said housing on the spindle of the wheel and axle mechanism.

4. In a device for measuring the camber and caster of a wheel and spindle mechanism, the combination of a housing provided with a pair of oppositely disposed observation openings, a dial member suitably mounted between the pair of oppositely disposed observation openings of said housing, said dial having symbols denoting the angle of camber or caster together with a radial surface adjacent said symbols, an indicator pivotally mounted at one side of the axis of the spindle and having an end adapted to move adjacent said radial surface of said dial, said indicator being provided with a pin member mounted thereon, and pivotally mounted means provided with a pair of slots engaging said pin member of said indicator for actuating said indicator in accordance with the amount of camber or caster of the wheel and axle mechanism, said pivotally mounted means having its pivot located on the same side of the axis of the spindle as said indicator member.

5. In a device for measuring the camber and caster of a wheel and spindle mechanism, the combination of means for measuring the angle of camber or caster, and a member for supporting said means, said member being supported directly on the spindle of the wheel and axle mechanism, said member comprising a nut portion having rigid annular wall portions extending to form a bushing integrally connected and formed therewith, said bushing being adapted to a slidably engage said means.

6. In a device for measuring the camber or caster of a wheel and axle mechanism provided with a spindle having a threaded portion together with a spindle nut, the combination of means for measuring the angle of camber or caster, said means being provided with a stud member extending therefrom, and a combined nut and bushing member for replacing said spindle nut and supporting said means, the nut portion of said combined nut and bushing member being adapted to engage the threaded portion of the spindle of said wheel and axle mechanism, said nut portion having a rigid annular wall extending to form a bushing portion with closed walls throughout its total length, said bushing portion of said combined nut and bushing member being adapted to engage said stud member of said means.

7. In a device for measuring the camber or caster of a wheel and spindle mechanism, the combination of a pendulum pivotally mounted at one side of the axis of said spindle, a member pivotally mounted at the same side of the axis of said spindle as said pendulum and provided with an indicator portion, pin and slot means connecting said pendulum and said member, said pin and slot means multiplying the movement of the indicator portion of said member relative to the movement of said pendulum, and means for indicating the movement of the indicator portion of said member.

8. In a device for measuring camber and caster of a wheel and axle mechanism, the combination of an indicator member pivotally mounted, a pendulum member pivotally mounted and provided with a counterweight portion to maintain the pendulum member normally in a vertical position, and a pin and slot mechanism for connecting said indicator and said pendulum members to transmit motion from said pendulum to said indicator members.

9. In a device for measuring camber and caster of a wheel and axle mechanism, the combination of an indicator member pivotally mounted and provided with a pin, and a pendulum member pivotally mounted and provided with a counterweight portion to maintain the pendulum member normally in a vertical position, said pendulum member being provided with a slot for engaging the pin of said indicator member.

10. In a device for measuring camber and caster of a wheel and axle mechanism, the combination of an indicator member pivotally mounted, a pendulum member pivotally mounted and provided with a counterweight portion for maintaining the pendulum member normally in an upright position, a pin member mounted on said indicator member and engaging said pendulum member to provide an operative connection whereby said indicator is actuated by said pendulum member at a reduced rate of speed relative to said pendulum member, and a dial mounted in association with said indicator member and provided with unequal spaces for indicating equal angles of camber and caster, said unequal spaces of said dial corresponding to differences of the arcs of travel of said pin of said indicator member and the point of engagement of said pendulum member with said pin of said indicator member.

11. In a device for measuring camber and caster of a wheel and axle mechanism, the combination of an indicator member pivotally mounted and provided with a pin member, and a pendulum member pivotally mounted at a center located in a horizontal plane extending substantially through the pivot center of said indicator member, said pendulum member being provided with a counterweight portion to maintain the pendulum member normally in an upright position, said pendulum member being provided with a lever arm having a forked end extending adjacent opposite sides of said indicator member, the forked ends of said pendulum member engaging said pin member of said indicator member, said indicator and said pendulum members being operatively connected together to transmit movement from the pendulum member to said indicator member, and a dial member associated with said indicator member and provided with graduations indicating angles of camber and caster.

12. In a device for measuring the camber and caster of a wheel and spindle mechanism, the combination of means for measuring the angle of camber and caster, said means being provided with an extension portion, and a combined nut and bushing adapted to engage said spindle of the wheel and spindle mechanism, said combined nut and bushing being provided with a nut portion having an annular wall portion extended to form a rigid annular wall portion of a bushing portion, said bushing portion being adapted to telescopically mount on said extension portion of said first mentioned means, said combined nut and bushing pivotally supporting said first mentioned means.

13. In a device for measuring the camber and caster of a wheel and spindle mechanism, the combination of means for measuring the angle of camber and caster, said means being provided with a housing, a stud member mounted in said housing, and a tubular member provided with annular wall portions provided with a bore for slidably and pivotally engaging said stud member, said annular wall portion of said tubular member being further rigidly connected with a nut portion for engagement with and securement to said spindle of the wheel and spindle mechanism.

14. In a device for measuring the camber and caster of a wheel and spindle mechanism, the combination of means for measuring the camber and caster, said means being provided with an extension portion, and a member provided with a nut portion for direct engagement with and securement to said spindle of the wheel and spindle mechanism, said nut portion of said member being extended to form an integral and rigid bushing portion adapted to telescopically and pivotally engage said extension portion of said housing to support said means.

15. In a device for measuring the angle of camber and caster of a wheel supported on the spindle of an axle mechanism, the combination of means for measuring the angle of camber and caster, a housing supporting and enclosing said means, said housing being provided with a member extending from one of its upright sides, and a nut member adapted to engage the spindle of the axle mechanism, said nut member engaging said member extending from said housing to support said housing and said means enclosed therein, said nut member having rigid walls throughout its total length.

ARMIN F. WEDLAKE.